United States Patent [19]

Katz

[11] Patent Number: 5,814,827

[45] Date of Patent: *Sep. 29, 1998

[54] OPTICAL SCANNER WITH EXTENDED DEPTH OF FOCUS

[75] Inventor: Joseph Katz, Stony Brook, N.Y.

[73] Assignee: Symbol Technologies, Inc., Holtsville, N.Y.

[*] Notice: The term of this patent shall not extend beyond the expiration date of Pat. No. 5,627,366.

[21] Appl. No.: 850,967

[22] Filed: May 5, 1997

Related U.S. Application Data

[63] Continuation-in-part of Ser. No. 445,228, May 19, 1995, Pat. No. 5,627,366.

[51] Int. Cl.⁶ .................................................... G06K 5/00
[52] U.S. Cl. ......................... 250/556; 250/566; 235/472; 382/313
[58] Field of Search .................................. 250/556, 557, 250/566, 235; 235/472, 462; 382/313, 316

[56] References Cited

U.S. PATENT DOCUMENTS

| | | | |
|---|---|---|---|
| 4,603,262 | 7/1986 | Eastman et al. | 250/566 |
| 4,818,886 | 4/1989 | Drucker | 250/566 |
| 5,192,856 | 3/1993 | Schaham | 235/462 |
| 5,210,398 | 5/1993 | Metlitsky | 235/462 |
| 5,396,053 | 3/1995 | Swartz et al. | 235/462 |
| 5,473,149 | 12/1995 | Miwa et al. | 235/472 |
| 5,627,366 | 5/1997 | Katz | 250/234 |

*Primary Examiner*—Que Le

[57] ABSTRACT

A scanner with an extended depth of focus for electro-optically reading indicia having parts of different light reflectivity, comprises a collection optical system for collecting radiation reflected from objects in the field of view along plural different optical axes and an optical detector for detecting radiation collected by the collection optical system along each of the plural different optical axes and for generating electrical output signals indicative thereof. The scanner further includes processing circuitry for processing the output signals of the optical detector by comparing the output signals of the optical detector with one another, a memory for storing the detector output signals and further processing circuitry receiving the stored output signals of the optical detector from the memory and selectively outputting one of the received signals to a decoder.

11 Claims, 8 Drawing Sheets

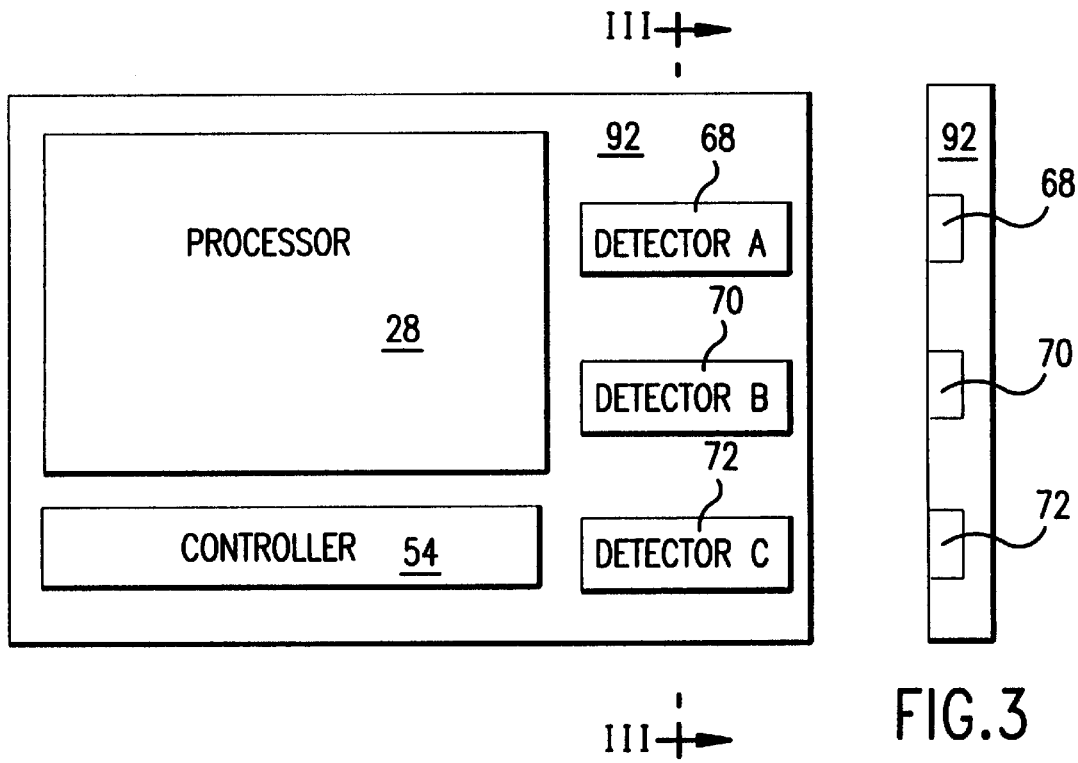
FIG.2
FIG.3
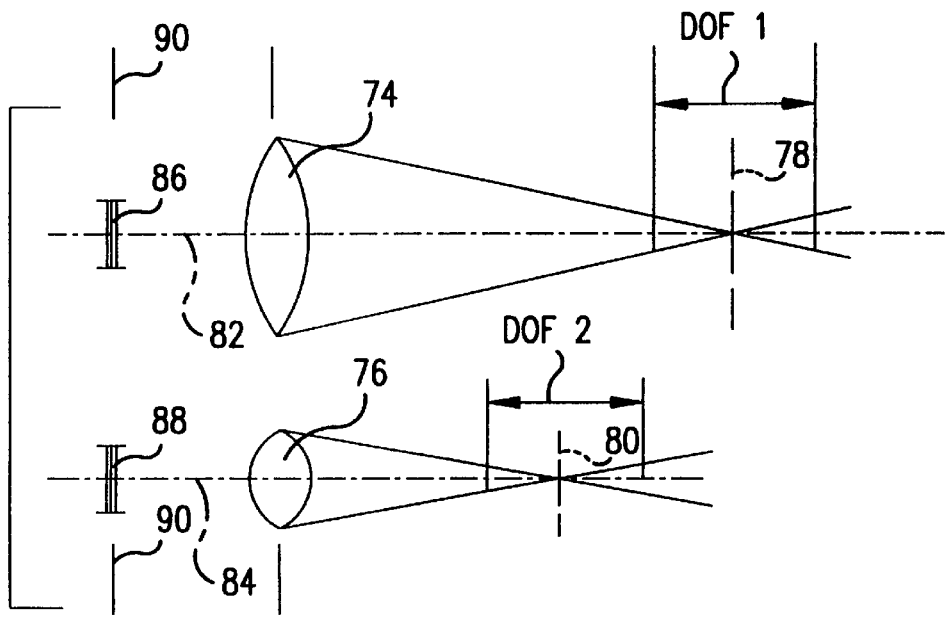
FIG.4

OPTICAL SCANNER WITH EXTENDED DEPTH OF FOCUS

This application is a continuation-in-part of U.S. patent application Ser. No. 08/445,228, filed on May 19, 1995, which issued as U.S. Pat. No. 5,627,366 on May 6, 1997.

BACKGROUND OF THE INVENTION

1. Field of the Invention

The present invention relates generally to an optical scanner and method of scanning with an extended depth of focus, and more particularly pertains to an optical scanner and method of scanning bar codes which achieves an extended depth of focus by employing a multifocal length optical system. The subject invention is particularly useful in an optical scanner employing a nonlaser radiation source such as a light emitting diode (LED) or a linear array of LEDs, but is also applicable to optical scanners employing a laser source such as a laser diode. The subject invention is very useful in CCD based bar code readers, and other solid state imaging (SSI) devices.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing. Inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

A further known symbology is known as two-dimensional (2D) symbology and is discussed in detail in commonly-assigned U.S. Pat. Nos. 5,243,655 and 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Decoding in 2D symbology is discussed particularly and shown in various flowcharts set forth in the 2D symbology patents incorporated by reference and above identified.

Laser scanners are not the only type of optical instrument capable of reading bar code symbols. Another type of bar code reader is one which incorporates a detector based upon charge coupled device (CCD) technology. CCDs are an array of many detectors. The entire symbol is flooded with light from the reader or ambient light, and each CCD detector is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

The depth of focus of bar code scanners using Light Emitting Diodes (LEDs) is very limited as compared to laser based scanners. Depth of focus is limited typically by geometrical defocusing, which is linear (approximately with f#).

Efforts have heretofore been made to provide an optical scanner and method of scanning with an extended depth of focus, e.g., as in U.S. Pat. No. 5,210,398, which issued on May 11, 1993, and is assigned to the same assignee as the instant application. The '398 patent is incorporated herein by this reference thereto.

The approach of the '398 patent involves the use of a multifocal length collection optical system, having at least a near range focal length and a long range focal length. The optical system collects radiation from objects in the field of view thereof and directs it to an optical detector for detection and generation of an electrical output signal indicative thereof.

In the '398 patent, the optical detector is disposed along an optical axis of the optical system and receives radiation focused at both focal lengths of the optical system and signals corresponding thereto are summed. A high pass filter removes the d.c. level from summed signal, or the summed signal may be applied to a differentiator. The output of the high pass filter or the differentiator constitutes the output detector signal. In either instance, the output detector signal exhibits an improved depth of modulation in respects of different light reflectivity parts in the field of view.

SUMMARY OF THE INVENTION

A primary object of the present invention is to provide an optical scanner and method of scanning with an extended depth of focus.

A further object of the subject invention is the provision of an optical scanner and method of scanning which achieves an extended depth of focus by employing a multifocal optical system.

In accordance with the teachings, herein the present invention provides an optical scanner and method of scanning with an extended depth of focus for electro-optically reading indicia having parts of different light reflectivity such as a bar code pattern.

In its optical scanner aspect, the invention provides a scanner comprising a collection optical system for collecting radiation reflected from objects in its field of view along plural different optical axes and optical detector means for detecting radiation collected by the collection optical system along each of the plural different optical axes and for generating electrical output signals indicative thereof.

More particularly, scanning apparatus in accordance with the invention involves first and second lens means for collecting radiation reflected from objects in the field of view thereof, the first and second lens means having respective different optical properties, a first optical detector for detecting radiation collected by the first lens means and for generating an electrical output signal indicative thereof and a second optical detector for detecting radiation collected by the second lens means and for generating an electrical output signal indicative thereof.

In its method aspect, the subject invention provides a method of scanning with an extended depth of focus for electro-optically reading indicia having parts of different light reflectivity comprising the steps of collecting radiation from objects in a field of view with a multifocal length collection optical system having plural different optical axes, detecting radiation collected by the collection optical system along each of plural different optical axes of the collection optical system and generating electrical output signals indicative of radiation collected by the collection optical system along each of plural different optical axes of the collection optical system and detected in the detection step.

In facilitating size reduction, the scanning apparatus of the invention employs the technology of CMOS imagers, or CCDs, making it possible to integrate various functions of a code reader on a single chip, i.e., an integrated microcircuit, an embodiment of which is set forth hereinafter. The optical detectors could be manufactured on a common substrate, or on individual substrates.

BRIEF DESCRIPTION OF THE DRAWINGS

The foregoing objects and advantages of the present invention for an optical scanner with an extended depth of focus may be more readily understood by one skilled in the art with reference being had to the following detailed description of preferred embodiments thereof, taken in conjunction with the accompanying drawings wherein like elements are designated by identical reference numerals throughout the several views, and in which:

FIG. 2 shows scanning apparatus of the invention employing the technology of CMOS imagers or CCDs;

FIG. 3 is a side elevation of the FIG. 2 apparatus as would be seen from plane III—III of FIG. 2;

FIG. 4 shows optical paths and optical axes for scanning apparatus of the invention employing a two lens collection optical system;

DETAILED DESCRIPTION OF PREFERRED EMBODIMENTS AND PRACTICES

Figure 1:
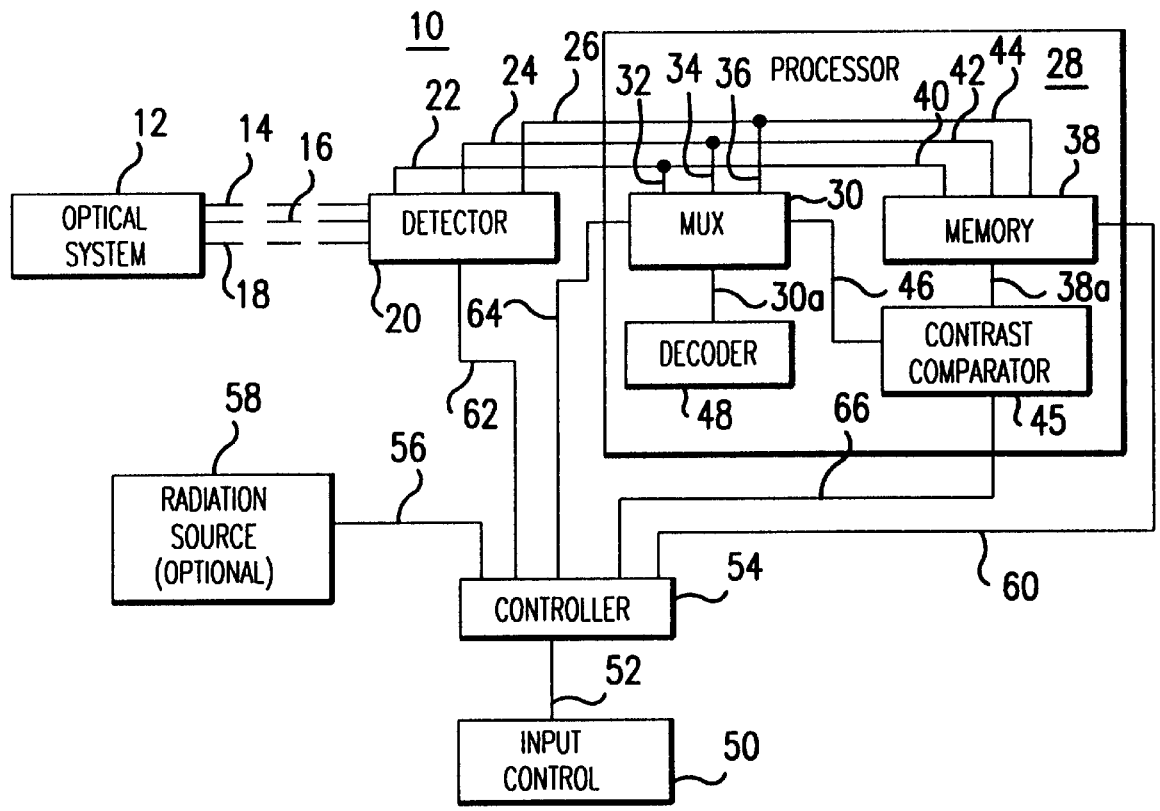
FIG. 1 is a functional block diagram of scanning apparatus in accordance with the invention.

Referring to FIG. 1, scanning apparatus 10 of the invention includes an optical system 12 which has plural, different output optical axes 14, 16 and 18, and which collects radiation incident thereon and applies the same to detector 20.

Detector 20 is an electro-optical converter and furnishes electrical signals on its output lines 22, 24 and 26, respectively corresponding with the radiation output from optical system 12 along optical axes 14, 16 and 18. Lines 22, 24 and 26 provide individual input signals to processor 28.

Multiplexer (MUX) 30 of processor 28 receives the line 22–26 signals over lines 32, 34 and 36. Memory 38 of processor 28 receives the line 22–26 signals over lines 40, 42 and 44. Memory 38 provides signals over lines 38a to contrast comparator 45, which controls the multiplexing state of MUX 30 by control signals furnished on lines 46. MUX 30 provides signals over lines 30a to decoder 48.

Input control 50 is manually operable, or automatically operable on object sensing, for activating scanning system 10 and furnishes an activating signal over line 52 to controller 54, which furnishes further activating signals over line 56 to radiation source 58, where used, for causing it to issue radiation into the field of view of scanning system 10, over line 60 to memory 38 to control write and read operations thereof, over line 62 to control functions in detector 20, inclusive of controlling an electronic shutter where a CCD array is used, over line 64 to enable MUX 30 and over line 66 to enable contrast comparator 38, all at respective times implementing operation of scanning apparatus 10. As indicated in FIG. 1, radiation source 58 is optional, i.e., ambient light may serve in its stead.

In more detail, controller 54 first causes operation of radiation source 58, when used, and concurrently opens shutters of detector 20.

Detector 20 has separate detecting units therein in number corresponding to the number of different optical axes of optical system 12. Referring to FIGS. 2 and 3, detectors A (68), B (70) and C (72) are preferably of a solid-state imaging type (SSI), such as a charge-coupled device (CCD), and in such instance, controller 54 times the charge clearing and accumulated charge readout functions of the SSI. Controller 54 is further operative, in respect of the timing of generation of its activating signals provided on lines 60 to control write/read operations of memory 38, and on lines 66 and 64, to effect contrast comparison of signals read from memory 38 and to enable MUX 30 at an appropriate time after contrast comparison to output the multiplexer input called for by the contrast comparison.

Referring to the schematic showing of FIG. 4, optical system 12 can be realized by as little as two lenses 74 and 76, having respective different optical properties, specifically different focal lengths, giving rise to respective different focal planes 78 and 80 along respective different optical axes 82 and 84. As in the case of the '398 patent, above incorporated by reference, there exist plural depths of field DOF1 and DOF2. However, unlike the scanning apparatus of the '398 patent, wherein there is a single optical axis along which such depths of field are present and a single detector (CCD 20 in FIG. 3 of the '398 patent) summing signals provided therein, the subject invention provides separate detectors 86 and 88. Lenses 74 and 76 are aspheric, for aberration correction. Detectors 86 and 88 may be disposed in common plane 90, or in different planes, as when the detectors are physically located on separate semiconductor chips.

Separate signals are thus provided, in contrast to the single detector output signal of the '398 patent, giving rise to the ability of separately processing the same, in contrast to the processing, e.g., by filtering or differentiation, of a composite signal in the '398 patent.

One of the two detector output signals will inherently contain better intelligence as respects the scanned bar code, as comparison thereof will establish. In the preferred embodiment of scanning apparatus 10 of FIG. 1, the detector output signals are compared as respects the contrast indications therein, e.g., by comparison of high frequency contents thereof, edge detection, etc. Memory 38 serves the purpose of temporary storage of detector output signals, averting the need for an "on-the-fly" comparison on the detector output signals in comparator 45.

As alluded to above, the invention looks to employment of the technology of CMOS imagers or CCDs, making it possible to integrate various functions of a code reader on a single chip. FIGS. 2 and 3 illustrate one such embodiment. Chip 92 has detectors 68, 70 and 72 exposed to radiation on one side thereof with the detectors being CCDs embedded on the chip. Chip 92 further has processor 28 and controller 54 integral therewith. When some of the detectors are located on different chips, each chip may contain various bar code reader functions, such that the combination of all the chips would comprise all of the necessary bar code reader functions.

Figure 5:
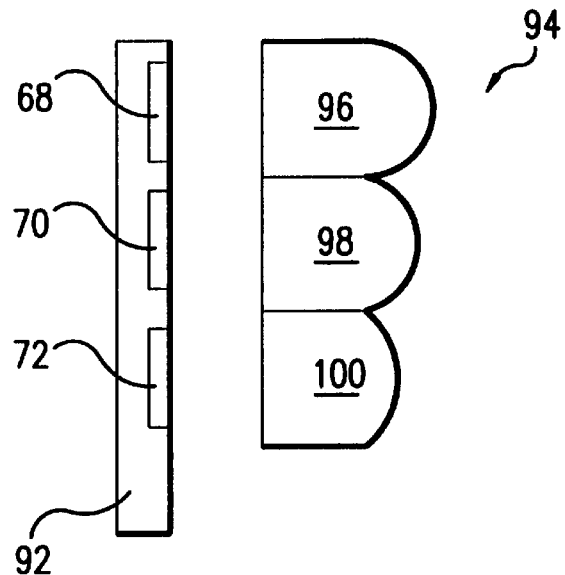
FIG. 5 is a showing of the positional relationships of the solid-state imagers of FIG. 2 and a multifocal length collection optical system.

Turning to FIG. 5, chip 92 is shown in association with collection optical system 94, the latter being supported such that plano-convex lenses thereof, three being identified by reference numerals 96, 98 and 100, are in respective registry with detectors 68, 70 and 72 and have respective different focal lengths.

Figure 6:
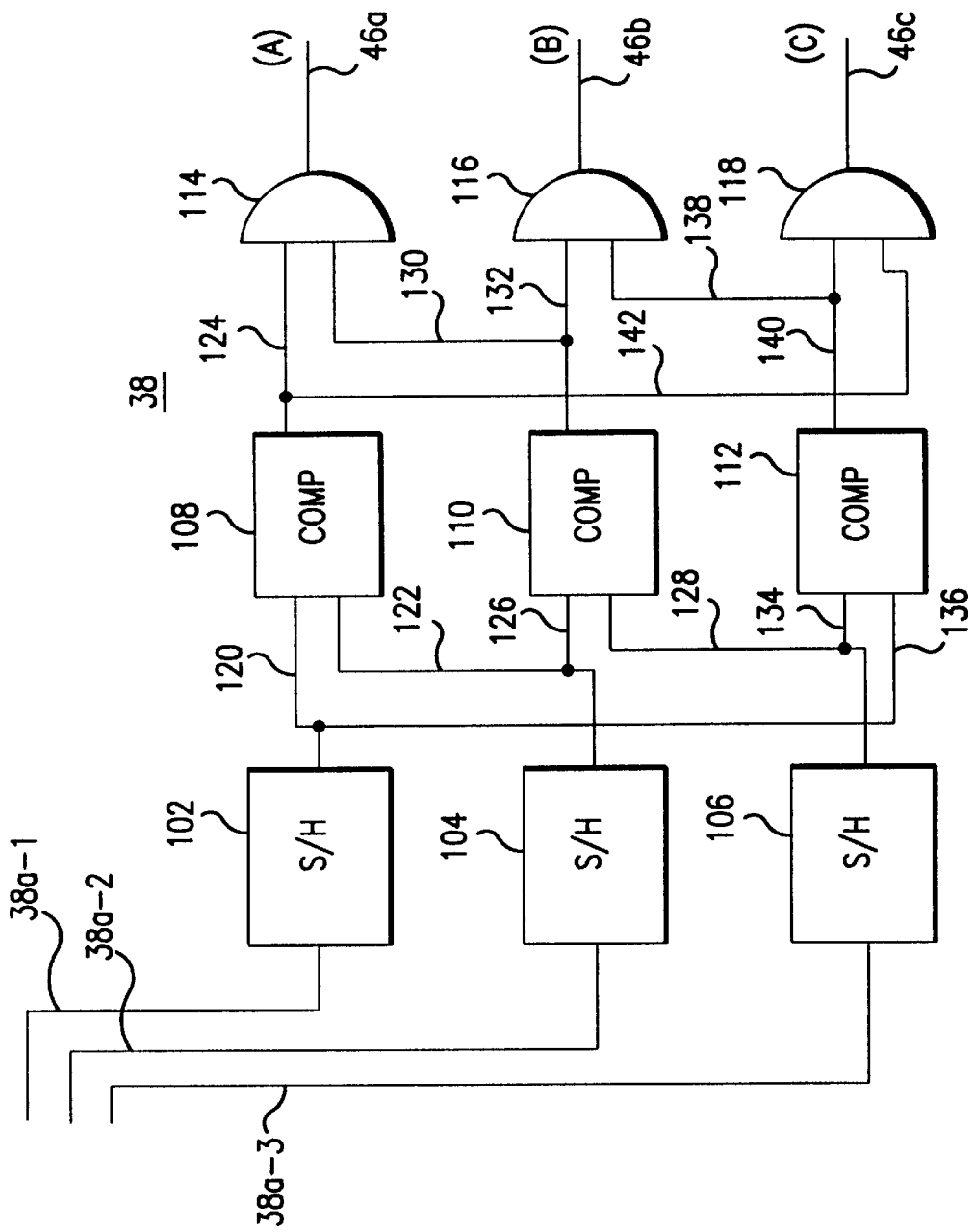
FIG. 6 is a schematic diagram of an embodiment of the contrast comparator of the FIG. 1 scanning apparatus.

FIG. 6 is a schematic diagram of contrast comparator 45 of the FIG. 1 scanning apparatus, assuming one-dimensional (1D) symbology. Input signals on lines 38a-1, 38a-2 and 38a-3 derive from memory 38 of FIG. 1, i.e., signals received by the memory from detector units 68, 70 and 72 of FIG. 2. Contrast comparator 38 has three channels (A), (B) and (C), the channels having respective sample and hold (S/H) circuits 102, 104 and 106, respective comparator circuits (COMP) 108, 110 and 112, and respective AND gates 114, 116 and 118.

In COMP 108, the A and B channel sampled and held contrast signals are compred, being furnished over lines 120 and 122. If A>B, line 124 goes HI. In COMP 110, the B and C channel sampled and held contrast signals are compared, being furnished over lines 126 and 128. If B>C, line 130 goes HI. Under these conditions, both inputs to AND gate 114 are HI and line 46a goes HI.

If B>C, line 132 furnishes a HI to AND gate 116. In COMP 112, the A and C channel sampled and held contrast signals are compared, being furnished over lines 134 and 136. If C>A, line 138 goes HI. Under these conditions, both inputs to AND gate 116 are HI and line 46b goes HI.

If C>A, line 140 goes HI. If A>B, line 142 goes HI, both inputs to AND gate 118 are HI and line 46c goes HI.

Lines 46a, 46b and 46c correspond to control lines 46 of FIG. 1 and their respective HI states cause the signals on lines 32, 34 and 36 to be selectively conducted through MUX 30 over lines 30a to decoder 48.

Figure 7:
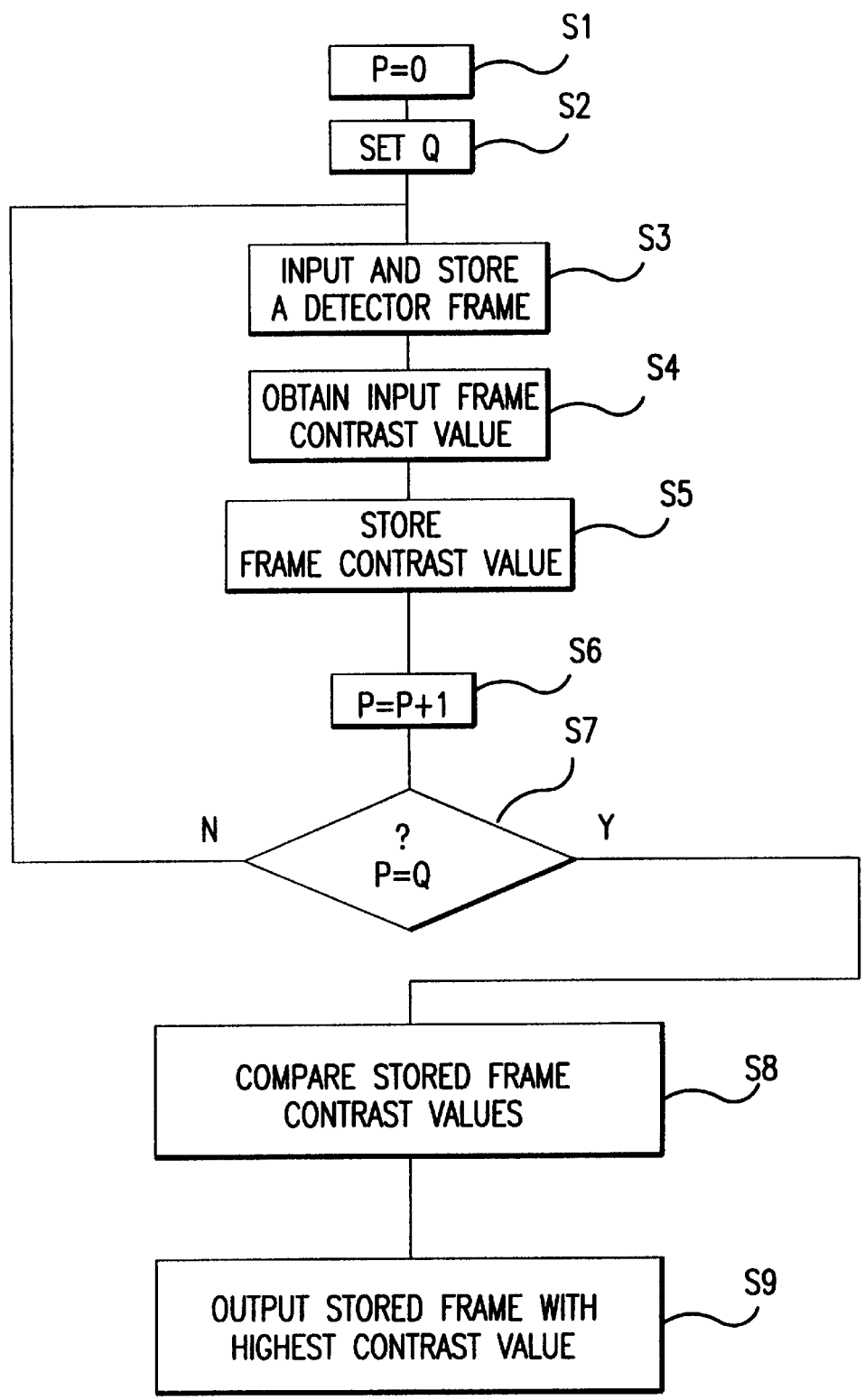
FIG. 7 depicts a flowchart of an embodiment of the invention where the contrast comparison of FIG. 6 is implemented in software in a microprocessor.

While the circuit arrangement of FIG. 6 is illustrative of a hardware implementation of a system in accordance with the invention, the invention is preferably implemented in software as in a microprocessor in lieu of contrast comparator 45 and MUX 30. The flow chart of FIG. 7 is illustrative of such software. Referring thereto, in step S1 P=0, constant p is initialized. In step S2, SET Q, constant q is set to a value equal to the number of participating contrast evaluation detectors.

In step S3, INPUT AND STORE A DETECTOR FRAME, signals output by a participating contrast evaluation detector are input. In step S4, OBTAIN INPUT FRAME CONTRAST VALUE, the signals of the input frame are processed for contrast content to obtain a measure of contrast for the frame. In step S5, STORE FRAME CONTRAST VALUE, the frame contrast value obtained in step S4 is stored along with identification of the frame being processed.

In step S6, P=P+1, constant p is incremented and progress is to step S7, ? P=Q. If the inquiry is answered in the negative (N), i.e., frames of all participating contrast evaluation detectors have not been processed, progress is to step S3 for inputting of the next frame from a different participant and steps S3 through S7 are repeated.

Upon affirmative answer (Y) to the step S7 inquiry, when contrast values have been stored for a frame from each participating contrast evaluation detector, progress is to step S8, COMPARE STORED FRAME CONTRAST VALUES, where the highest contrast value frame is identified. Progress is then to step S9, OUTPUT STORED FRAME WITH HIGHEST CONTRAST VALUE, where the stored output signals of the detector whose frame has the highest contrast are output. The routine is repeated for each symbol scan.

Figure 8:
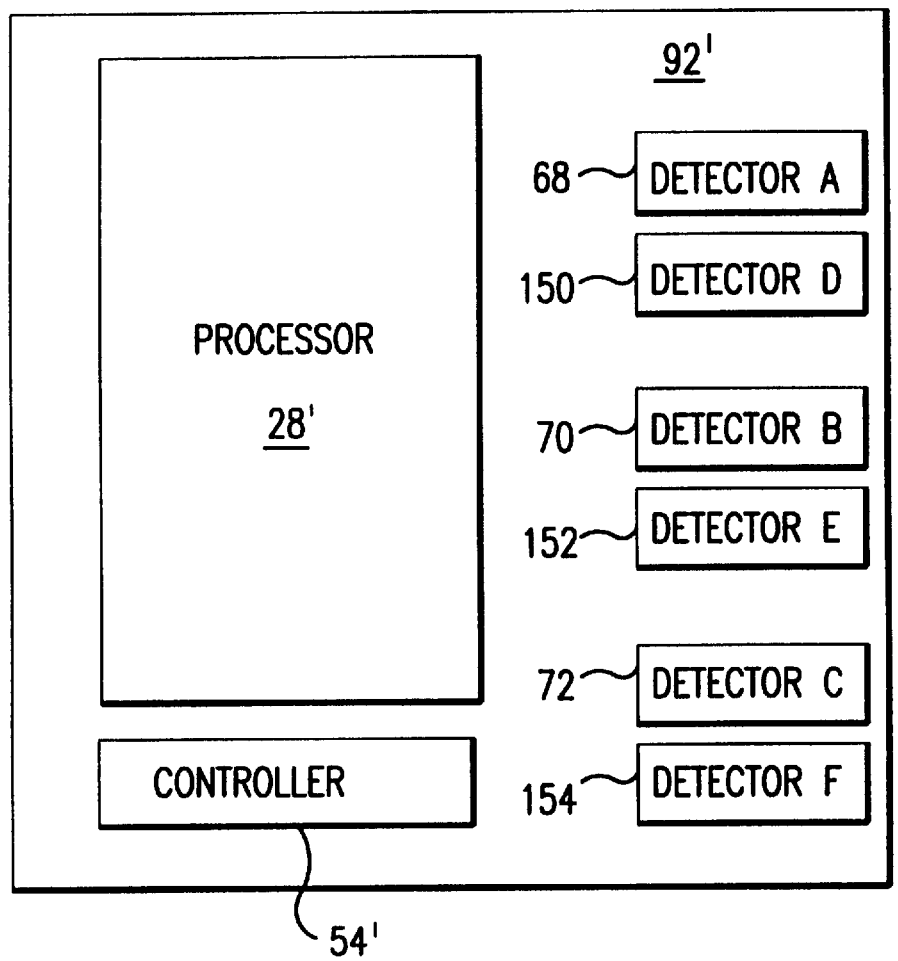
FIG. 8 shows a modified version of the system of FIG. 2, wherein use is made also of one-dimensional symbology detectors.

FIG. 8 shows a modified version of the system of FIG. 2, wherein detectors D (150), E (152) and F (154) are included on chip 92'. Detectors A and D are paired, detectors B and E are paired as are detectors C and F. Whereas detectors A, B and C are capable of reading two-dimensional symbology, detectors D, E and F need only be linear and have capability for reading one-dimensional symbology. When used in conjunction with this invention, the linear CCDs are used to measure contrast, rather than to decode a one-dimensional bar code.

Processor 28' receives the output signals of all detectors and derives contrast information by examining only the one-dimensional detector output signals under control of controller 54'. It then outputs the two-dimensional detector output signals of the detector paired with the one-dimensional detector exhibiting highest contrast in its output signals.

Figure 9:
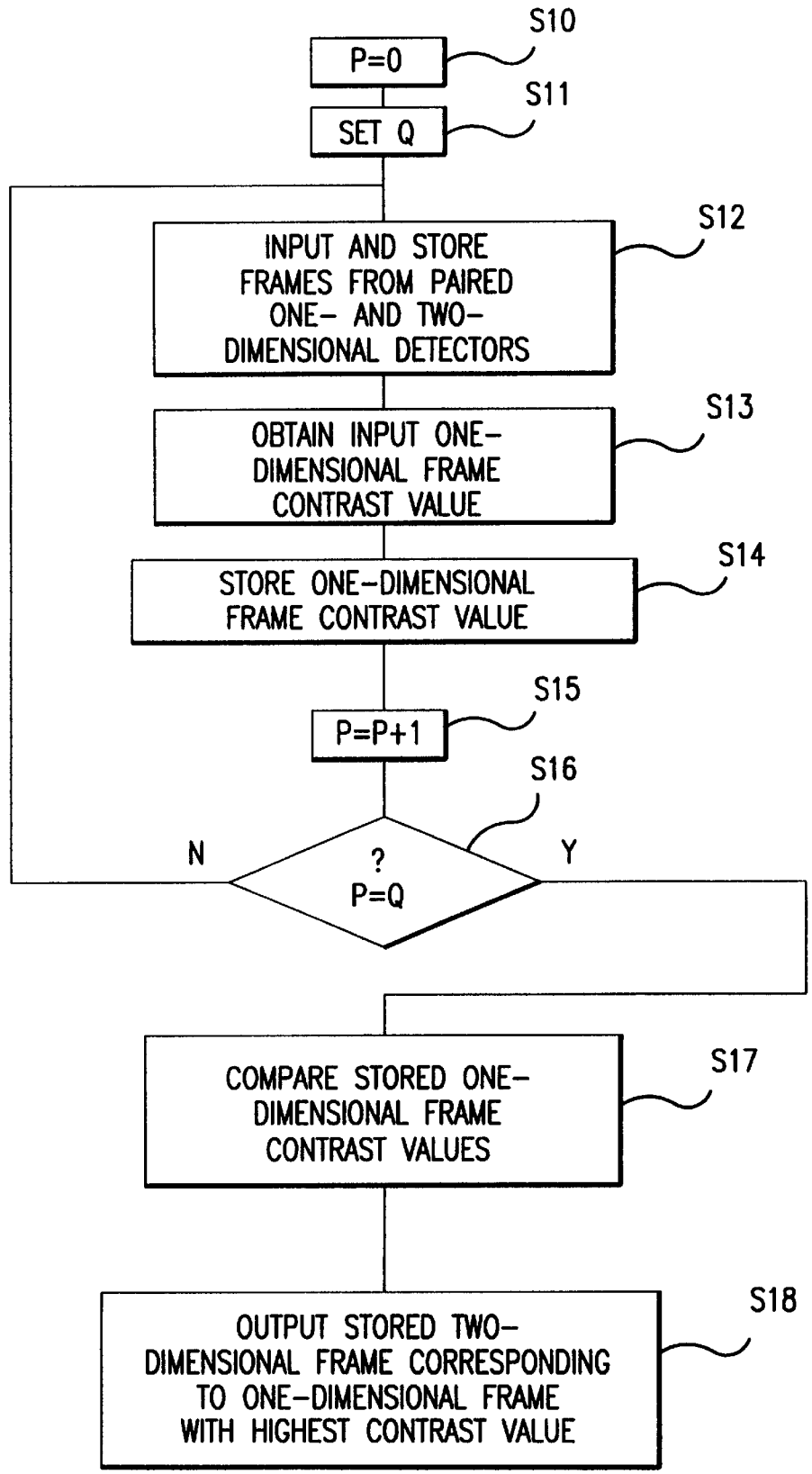
FIG. 9 shows a flow chart definitive of the operation of processor 28 of the FIG. 8 system.

The flow chart of FIG. 9 is definitive of this operation of processor 28'. Referring thereto, in step S10, P=0, constant p is initialized. In step S11, SET Q, constant q is set to a value equal to the number of pairs of participating contrast evaluation detectors. In step S12, INPUT AND STORE FRAMES FROM PAIRED ONE- AND TWO-DIMENSIONAL DETECTORS, signals output by one pair of participating contrast evaluation detectors are input. In step S13, OBTAIN INPUT ONE-DIMENSIONAL FRAME CONTRAST VALUE, the signals of the input one-dimensional frame are processed for contrast content to obtain a measure of contrast for the beam. In step S14, STORE ONE-DIMENSIONAL FRAME CONTRAST VALUE, the one-dimensional frame contrast value obtained in step S13 is stored along with identification of the frame pair being processed.

In step S15, P=P+1, constant p is incremented and progress is to step S16, ? P=Q. If the inquiry is answered in the negative (N), i.e., one-dimensional frames of all participating contrast evaluation detector pairs have not been processed for contrast, progress is to step S10 for inputting of the next frame from a different participant and steps S11 through S16 are repeated.

Upon affirmative answer (Y) to the step S16 inquiry, i.e., when contrast values have been stored for a one-dimensional frame from each participating contrast evaluation detector pairs, progress is to step S17, COMPARE STORED ONE-DIMENSIONAL FRAME CONTRAST VALUES, where the highest contrast value one-dimensional frame is identified. Progress is then to step S18, OUTPUT STORED TWO-DIMENSIONAL FRAME CORRESPONDING TO ONE-DIMENSIONAL FRAME WITH HIGHEST CONTRAST VALUE, where the stored output signals of the two-dimensional detector whose paired one-dimensional detector frame has the highest contrast are output. The routine is repeated for each symbology scan.

Figure 10:
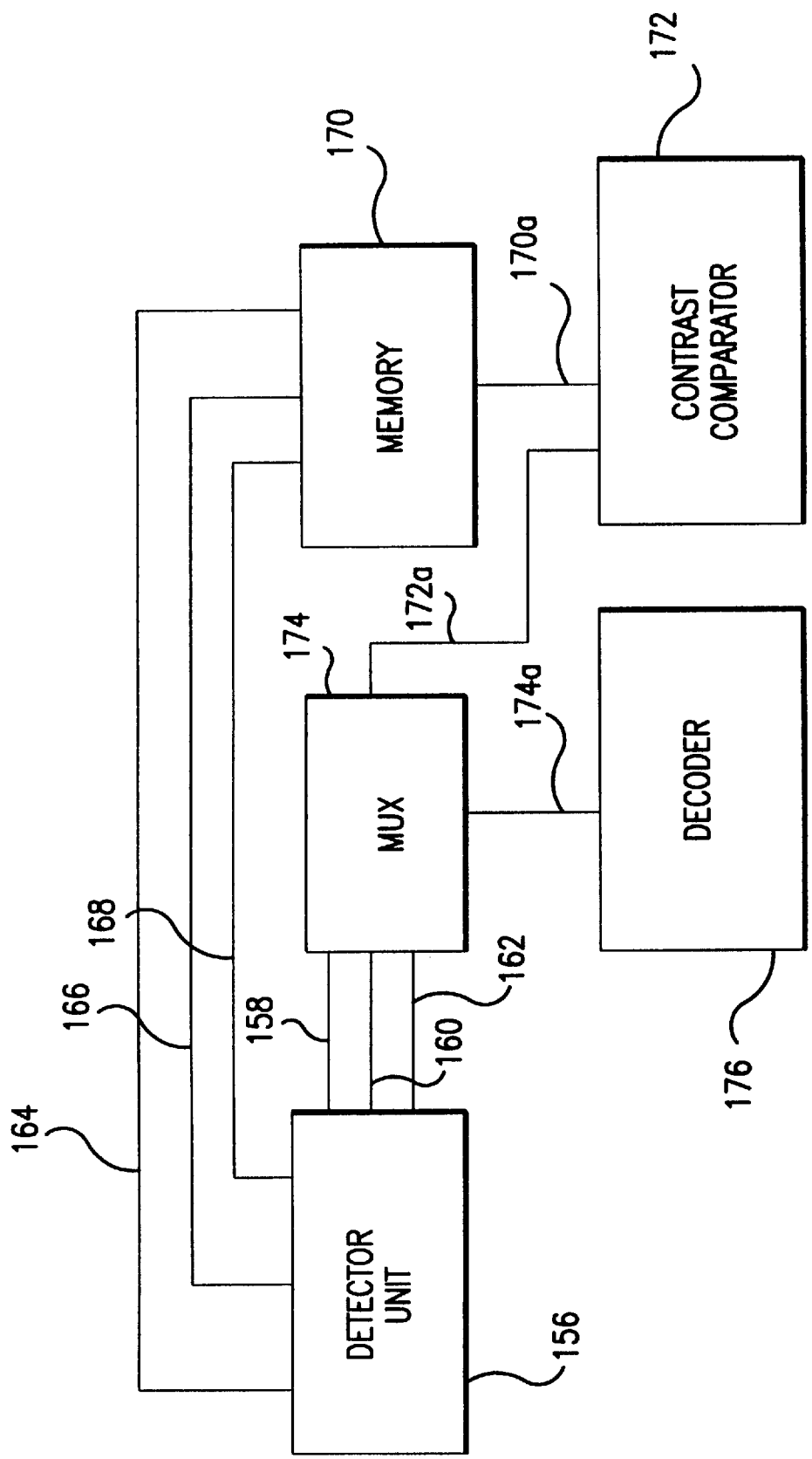
FIG. 10 is a functional block diagram of a hardware implementation of the process of FIG. 9.

The functional block diagram of FIG. 10 shows a hardware implementation of a one- and two-dimensional system. Detector unit 156 includes detectors A–F of FIG. 8 and corresponding sample and hold circuits (not shown) and provides output signals indicative of individual detector findings on lines 158, 160 and 162 for the two-dimensional detectors and on lines 164, 166 and 168 for the one-dimensional detectors. Memory 170 is connected to one-dimensional detector unit output lines 164, 166 and 168 and furnishes stored one-dimensional frame signals over lines 170a to contrast comparator 172, which may be configured as in FIG. 6. Detector unit output lines 158, 160 an 162 are connected as inputs to multiplexer 174, which is controlled by comparator 172 by signals on lines 172a. The multiplexer output selected by comparator 172 is supplied to decoder 176 over lines 174a.

Figure 11:
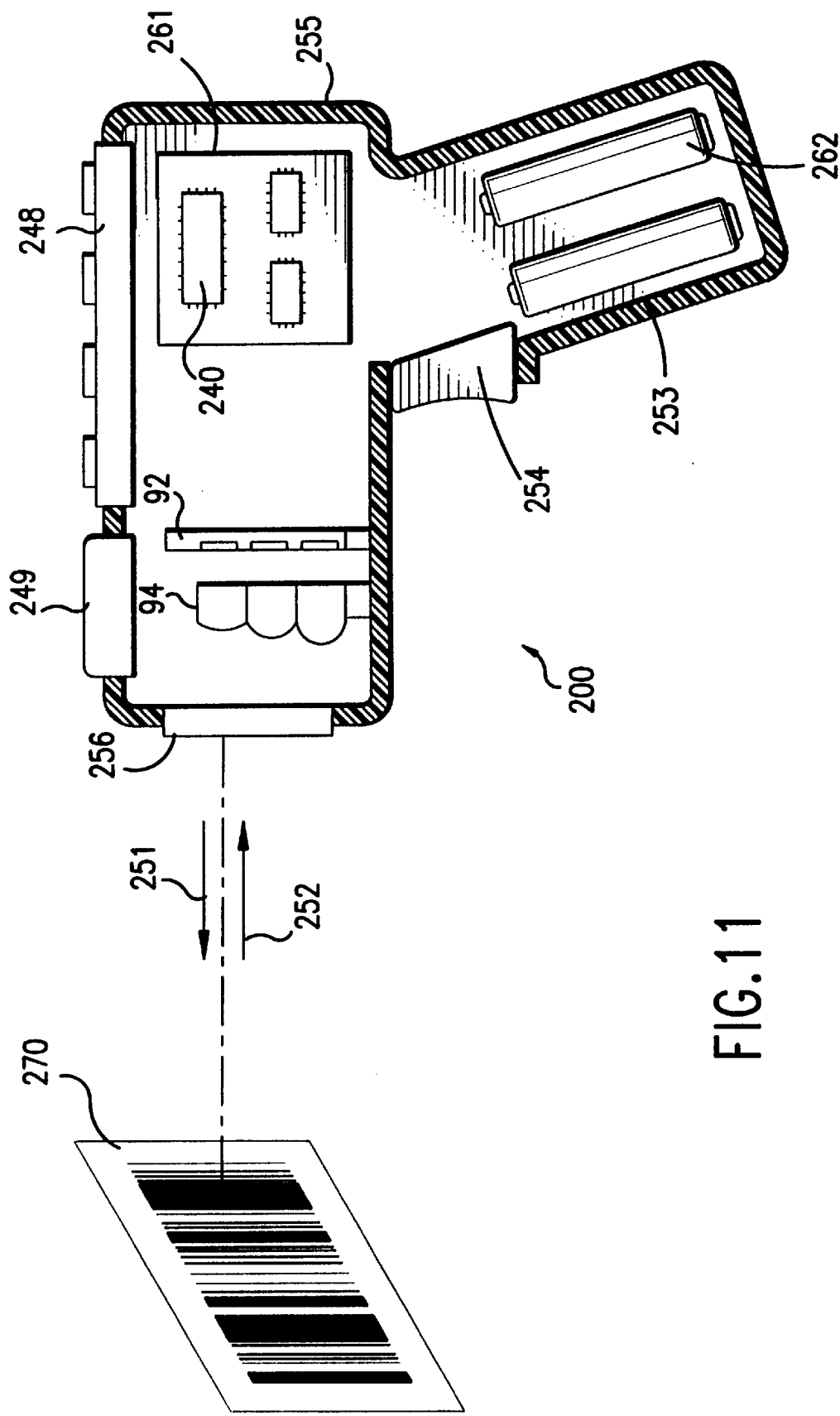
FIG. 11 depicts a hand-held scanner arrangement in which the systems of the invention may be embodied.

FIG. 11 illustrates a highly simplified embodiment of one type of bar code reader that may be modified to utilize the optical scanner with an extended depth of focus of the present invention. A reader may be implemented in a hand-held scanner, as illustrated, or a desk-top work station or stationery scanner. In a preferred embodiment, the arrangement is implemented in a housing 255 that includes an exit port 256 through which an outgoing laser light beam 251 is directed to impinge on, and to be scanned across, symbols 270 located exteriorly of the housing.

The hand-held device of FIG. 11 is generally of the style disclosed in the U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 11. These U.S. Pat. Nos. 4,760,248, 4,896,026 and 4,409,470 are incorporated herein by reference, but the general design of such devices will be briefly described here for reference.

Referring to FIG. 11 in more detail, an outgoing light beam 251 is generated in reader 200, and directed to impinge upon a bar code symbol disposed on a target in front of the reader unit.

Reflected and/or scattered light 252 from the symbol is focused by collection optical system 94 and detected by detector 92, both above described, producing serial electrical signals to be processed and decoded for reproducing the data represented by the bar code. As used hereinafter, the tern "reflected light" shall mean reflected and/or scatted light.

In a preferred embodiment, the reader unit is a gun shaped device having a pistol-grip type of handle 253. A movable trigger 254 is employed to allow the user to activate the light beam 251 and detector circuitry when the user has positioned the device to point at the symbol to be read. A light-weight plastic housing 255 contains the light source, detector 92, collection optical system 94 and signal processing circuitry 261, which includes CPU 240. A power source in the form of battery 262 is provided. A light-transmissive window 256 in the front end of the housing 255 allows the outgoing light beam 251 to exit and the incoming reflected light 252 to enter.

The reader may also function as a portable computer terminal, and include a keyboard 248 and a display 249, such as described in the previously noted U.S. Pat. No. 4,409,470.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

Apart from the particularly noted, in which all components other than the radiation source and the collection optical system are provided in an integrated microcircuit, the elements of the scanner may be assembled otherwise into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component, as shown in the referenced and incorporated '398 patent. Control of data lines associated with such components may be connected to an electrical connector mounted on the edge or external surface of the module to enable the module to be electrically connected to a mating connector associated with other elements of data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by lower power radio broadcast from the portable terminal to a stationary receiver.

By way of summary and introduction to the ensuing claims, the invention will be seen to provide a scanner with an extended depth of focus for electro-optically reading indicia having parts of different light reflectivity. The scanner comprises a collection optical system for collecting radiation reflected from objects in the field of view along plural different optical axes and optical detector means for detecting radiation collected by the collection optical system along each of the plural different optical axes and for generating electrical output signals indicative thereof.

Processing circuitry for processing the output signals of the optical detector means preferably comprises a microprocessor programmed to compare the output signals of the optical detector means with one another, particularly for focus or contrast thereof. Where otherwise implemented, the processing circuitry may include multiplexer circuitry receiving the output signals of the optical detector means and selectively outputting one of the received signals as a scanner output signal responsively to the output of comparator circuitry which determines the highest contrast optical detector output signal.

The detector means and the processing circuitry are preferably constituted as parts of an integrated microcircuit structure.

The invention also provides a scanner with an extended depth of focus for electro-optically reading indicia having parts of different light reflectivity, comprising first and second lens means for collecting radiation reflected from objects in the field of view, the first and second lens means having respective different optical properties, such as focusing properties, a first optical detector for detecting radiation collected by the first lens means and for generating an electrical output signal indicative thereof and a second optical detector for detecting radiation collected by the second lens means and for generating an electrical output signal indicative thereof.

A method of scanning with an extended depth of focus for electro-optically reading indicia having parts of different light reflectivity comprises the steps of collecting radiation from objects in the field of view with a multifocal length collection optical system having plural different optical axes, detecting radiation collected by the collection optical system along each of plural different optical axes of the collection optical system and generating electrical output signals indicative of radiation collected by the collection optical system along each of plural different optical axes of the collection optical system and detected in the detecting.

The invention further provides a scanner for electro-optically reading indicia having parts of different light reflectivity, comprising a collection optical system for collecting radiation reflected from objects in a field of view and optical detector means for detecting radiation collected by the collection optical system, the detector means including paired detectors respectively for detecting one-dimensional symbology and two-dimensional symbology. Processing means outputs a selective one of output signals of two-dimensional symbology detectors by processing output signals of one-dimensional symbology detectors.

The invention further provides a scanner for electrooptically reading indicia having parts of different light reflectivity, comprising a collection optical system for collecting radiation reflected from objects in a field of view and optical detector means for detecting radiation collected by the collection optical system, the detector means including at least one CMOS array having a plurality of smart pixels. The smart pixels provide respective output signals indicative of contrast level of radiation incident thereon. Sampling circuitry samples the pixel output signals and circuit means receives sampled pixel output signals from the sampling circuitry and outputs the output signals of one of first and second CMOS arrays in accordance with the contrast level indications in the sampled pixel output signals.

While several embodiments and variations of the present invention for an optical scanner with an extended depth of focus are described in detail herein, it should be apparent that the disclosure and teachings of the present invention will suggest many alternative designs to those skilled in the art.

In another embodiment, the SSI detectors and the processing circuitry may be located on different semiconductor chips. The detector array itself could be made up of a number of separate semiconductor chips, with each chip containing one or more of the individual detectors located in either a common or separate plane with respect to other chips.

What is claimed is:

1. A bar code reading device with an extended depth of focus for reading complete lines of bar code information by optically scanning light reflected from a bar code symbol having bars and spaces of different light reflectivity, said bar code reading device comprising:

(a) a plurality of integrated circuits, each of said circuits comprising an addressable solid-state-imaging detector, each of said detectors comprising an array of individual photosensors arranged so as to receive light reflected from the entirety of said bar code symbol without requiring any movement of the bar code reading device as a whole relative to the bar code symbol;

(b) a plurality of lenses, each of said lenses having a focal length different from each other, each of said lenses associated with and focused on a corresponding one of said detectors so as to provide a plurality of lens/detector pairs, wherein each of said lens-detector pairs provides an optical axis different from and substantially parallel with each other;

(c) a processor for selecting the lens/detector pair that provides a desired optical property when said bar code symbol is placed in a field of view of at least one of said lens/detector pairs.

2. The bar code reading device of claim 1 further comprising bar code data decoder, and wherein data from the lens/detector pair selected by said processor as having a desired optical property is provided to said bar code data decoder.

3. The bar code reading device of claim 2 wherein said processor selects the lens/detector pair that provides the highest degree of focus as the desired optical property.

4. The bar code reading device of claim 3 wherein said processor comprises:

(i) a memory for storing contrast data output from each of said detectors;

(ii) a contrast comparator for measuring the relative contrast between each of said detectors and selecting the detector with the highest relative contrast measurements;

(iii) means for providing, to said bar code data decoder, data from the detector selected to have to the highest relative contrast measurements.

5. The bar code reading device of claim 4 wherein said processor is comprised on one of said integrated circuits.

6. The bar code reading device of claim 4 wherein said contrast comparator comprises:

(i) a plurality of sample and hold circuits, each of said sample and hold circuits associated with data from memory provided by each of said detectors, each of said sample and hold circuits providing an output signal indicative of the relative contrast of each of said associated detectors;

(ii) a plurality of comparison circuits for comparing each output signal from each sample and hold circuit with each other so as to provide a plurality of signals indicative of the relative contrast measurements between each detector; and (iii) logic means for providing an output signal indicative of the detector having the highest relative contrast measurement.

7. The bar code reader of claim 6 wherein said data providing means comprises a multiplexer, said multiplexer being controlled by said output signal from said logic means indicative of the detector having the highest relative contrast measurement.

8. A method for reading a bar code at various distances using a bar code reader having a plurality of optical lense/solid-state-detector pairs, each of said pairs having its own optimum bar-code-placement zone, said method comprising the steps of:

a) placing the bar code a fixed distance away from and within a field-of-view of said bar code reader;

(b) illuminating said bar code with an illuminating sourse;

(c) extracting a detector output signal from each of said lense/detector pairs;

(d) comparing the extracted output signals;

(d) selecting a desired output signal from the extracted output signals based upon a predetermined signal criteria; and (e) decoding the desired output signal.

9. The method of claim 8, wherein the illuminating sourse is located outside of the bar code reader.

10. The method of claim 8, wherein the illuminating sourse is located inside the bar code reader.

11. The method of claim 8, wherein the predetermined signal criteria is a relative contrast level.

* * * * *